United States Patent [19]

Field et al.

[11] Patent Number: 5,637,174

[45] Date of Patent: Jun. 10, 1997

[54] APPARATUS FOR AUTOMATED ONE-UP PRINTING AND PRODUCTION OF AN IDENTIFICATION CARD

[75] Inventors: Gary Field, Portsmouth; Paul V. Corpus; Paul S. Follett, both of Wakefield; Harold D. Schofield, Narragansett; Christian S. Rothwell, North Kingston; Edward A. Nardone, Wakefield, all of R.I.

[73] Assignee: Atlantek, Inc., Wakefield, R.I.

[21] Appl. No.: 419,155

[22] Filed: Apr. 10, 1995

[51] Int. Cl.⁶ .......................... B32B 31/08; B32B 31/18
[52] U.S. Cl. .............. 156/256; 156/264; 156/272.4; 156/277; 156/351; 156/379.7; 156/384; 156/387; 156/517; 156/556; 283/82; 283/109; 283/111
[58] Field of Search ............................. 156/277, 256, 156/264, 263, 272.4, 384, 387, 379.7, 517, 556, 250, 510, 351; 283/82, 107, 109, 110, 111

[56] References Cited

U.S. PATENT DOCUMENTS

| | | | |
|---|---|---|---|
| 3,152,901 | 10/1964 | Johnson | 156/277 |
| 3,402,488 | 9/1968 | Leavitt | 156/277 |
| 3,413,171 | 11/1968 | Hannon | 156/277 |
| 3,716,439 | 2/1973 | Maeda | 283/109 |
| 4,100,011 | 7/1978 | Foote | 156/277 |
| 4,287,285 | 9/1981 | Mosehauer | 156/277 |
| 4,592,976 | 6/1986 | Whitehead | 283/112 |
| 4,938,830 | 7/1990 | Cannistra | 283/109 |
| 4,999,065 | 3/1991 | Wilfert | 283/109 |
| 4,999,075 | 3/1991 | Coburn, Jr. | 156/277 |
| 5,021,318 | 6/1991 | Mayo et al. | 283/109 |
| 5,210,581 | 5/1993 | Kuzuya | 156/277 |
| 5,250,133 | 10/1993 | Kawamura et al. | 156/277 |
| 5,261,987 | 11/1993 | Luening et al. | 156/277 |

FOREIGN PATENT DOCUMENTS

| | | | |
|---|---|---|---|
| 431564 | 6/1991 | European Pat. Off. | 283/107 |
| 3-222797 | 10/1991 | Japan | 283/107 |

*Primary Examiner*—Jay H. Woo
*Assistant Examiner*—Duane S. Smith
*Attorney, Agent, or Firm*—Salter & Michaelson

[57] ABSTRACT

A system for the automated production of an identification card includes a two-part security media and apparatus for printing, laminating and die-cutting the security media to form discrete identification cards. The two-part security media includes a continuous web of an opaque backing film, and a continuous web of a clear cover film which acts as a receptor for receiving a thermally printed digital card image. A first thermal web printer is operative for printing a reversed digital card image onto an inner surface of the cover film adjacent a terminal end thereof. A second thermal web printer prints a second image onto the back of the backing film at a terminal end thereof. The printed ends of the backing and cover films are advanced to a cutting station wherein they are aligned in overlying relation and severed from their webs. The aligned films are then advanced to a laminating station including a heated input nip for laminating the films under pressure and heat, a heated platen for heat-fusing the thermoplastic films together, and fan-cooled heat sinks for cooling the fused film construction. The fused laminate film construction is advanced to a die-cutting device which die cuts a predetermined size card from the laminate construction, and advances the die-cut card to a magnetic stripe encoder for encoding of a magnetic stripe on the back surface of the backing film.

8 Claims, 4 Drawing Sheets

APPARATUS FOR AUTOMATED ONE-UP PRINTING AND PRODUCTION OF AN IDENTIFICATION CARD

BACKGROUND AND SUMMARY OF THE INVENTION

The instant invention relates to automated apparatus for producing identification cards, and more particularly to an automated system for instant, one-up custom printing, laminating and die-cutting of identification cards from a two-part security media.

Traditional identification cards, such as state license cards, and university identification cards typically comprise a three-part laminate system in which a photographic insert is sealed within a pouch having upper and lower laminate layers, or between upper and lower laminate sheets. The photographic insert typically comprises a die-cut sheet of polaroid instant film wherein a photograph of the card holder is optically superimposed over a portion of a pre-printed card having the card holder's personal information typed, or printed thereon. The polaroid card image is manually die cut from the film sheet in a hand actuated press, placed within the pouch, or between the laminate sheets, and then manually fed into a roll laminator in a protective foil sleeve, wherein the photographic image is sealed between the laminate sheets. In most cases, multiple card photographs are exposed on a single sheet of photographic film in order to reduce waste of the expensive instant photographic material, and thereby reduce the per card cost of production. In other systems, a plurality of card holder's photographs are taken in 35 mm film format, and then combined with printed cards bearing their corresponding personal information at central issuance centers. Central issuance of identification cards has been found to be efficient as well as cost effective. However, there is a delay in receiving cards as well as the potential to incorrectly match personal information with the correct photograph. Furthermore, the central issuance system discourages the production of cards in small batches, as well as the custom production of individual cards when replacements are necessary. While the above technologies are effective for their intended purpose, it has been found that there is an increasing need in the industry for an automated system which automatically prints, laminates and die-cuts identification cards in an instant, one-up format, wherein a single card can be easily and inexpensively produced within a minute's time.

The instant invention provides a system for the automated production of an identification card comprising a two-part thermoplastic security media and apparatus for printing, laminating and die-cutting of the security media to form discrete identification cards. The security media comprises an opaque thermoplastic backing film, and a transparent thermoplastic cover film which acts as a receptor for receiving a thermally printed digital card image. More specifically, the backing film preferably comprises a white amorphous copolyester film, while the cover film preferably comprises a clear polyvinyl chloride film. In general, the apparatus consists of thermal printing apparatus for printing the digital card image onto the security media, laminating means for laminating the security media together, and die-cutting means for die cutting a predetermined size card from the laminated security media. The two-part security media is provided in roll format wherein a first continuous web comprises the opaque backing film, and a second continuous web comprises the clear cover film. The thermal printing apparatus is based on a digital imaging system wherein a digital portrait of the card holder is combined by custom computer software with a background, card holder signature and alphanumeric text to produce a complete digital full-color card image. A first thermal web printer is operative for printing the color card image onto an inner surface of the cover film adjacent a terminal end of the cover film web. The computer software automatically reverses the card image so that it appears in its correct orientation when viewed through the top of the cover film. A second thermal web printer is operative for printing a second monochromatic image onto a back surface of the backing film adjacent a terminal end of the backing film web. The thermal web printers preferably comprise thermal dye-transfer printer apparatus having a reverse print direction for printing from a mid-point of the web toward a terminal end thereof. The printed terminal ends of the backing material and the cover film are advanced through guides to a cutting station wherein the printed terminal ends are aligned in overlying relation with the printed card image positioned between the cover film and the backing film. The aligned terminal ends are then clamped and severed from their webs to produce individual laminate films. The aligned films are then advanced to a laminating station including a heated input nip for initial laminating the aligned films under pressure and heat, a heated platen for heat-fusing the laminated films together, and fan-cooled heat sinks for cooling the laminate film construction. The laminator preferably utilizes face-to-face belts to transport the laminate films through the heating and cooling stations. The fused laminate film construction is thereafter advanced via guide channels to an automatic die-cutting device which die cuts a predetermined size card from the laminate construction, and advances the die-cut card to a magnetic stripe encoder which encodes a magnetic stripe on the back surface of the backing film. The die cutter further ejects the waste materials through a separate outlet. The result is a custom printed identification card which is produced in about one minute from printing to magnetic encoding.

Accordingly, among the objects of the instant invention are the provision of automated apparatus for instant, one-up printing, laminating and die-cutting of a single identification card from a two-part security media; the provision of printing apparatus for printing a card image onto the security media; the provision of laminating apparatus for laminating the security media together; the provision of die-cutting apparatus for die cutting a predetermined size card from the laminated security media; and the provision of guide and advancing mechanisms for guiding and advancing the security media through the printing, laminating and die-cutting apparatus.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENTS

Figure 1:
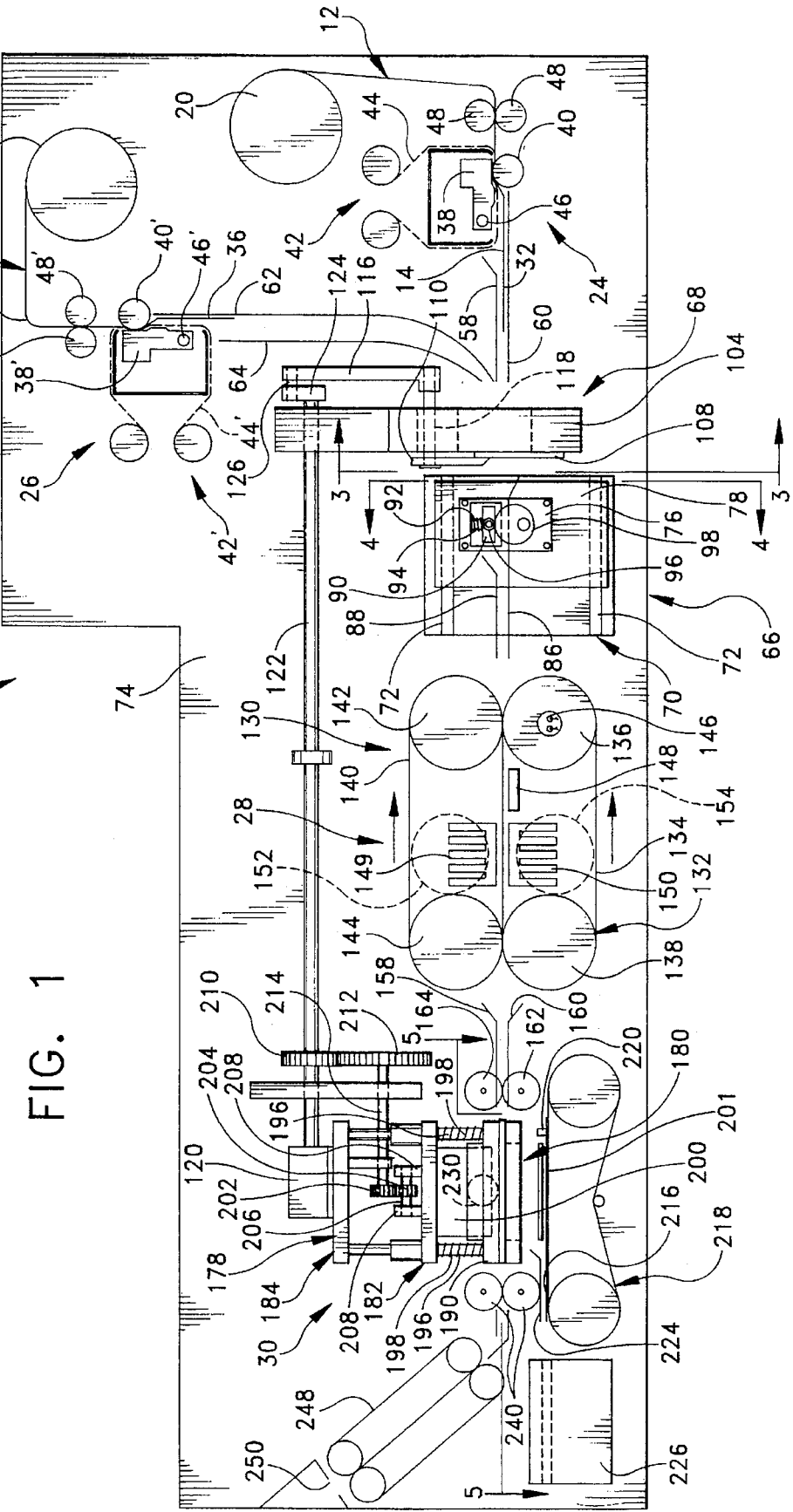
FIG. 1 is a front elevational view of the card production apparatus of the instant invention.

Referring now to the drawing figures, the apparatus of the instant invention is illustrated and generally indicated at 10 in FIGS. 1-5. As will hereinafter be more fully described, the instant apparatus 10 is operative for the automated production of an identification card from a two-part security media. The security media preferably comprises a proprietary media developed by Minnesota Mining and Manufacturing Company of Saint Paul, Minnesota comprising a thermoplastic cover film 12 which acts as a receptor for receiving a thermally printed, computer generated digital card image 14, and an opaque thermoplastic backing film 16. The card image 14 is preferably printed in reverse image onto an inner surface 18 of the cover film 12 so that it is located between the backing and cover films 12, 16 when they are secured together. When viewed through the upper side of the cover film 12, the reversed card image 14 appears in its' correct orientation. The backing film 16 preferably comprises an amorphous copolyester film, while the cover film 12 comprises a rigid polyvinyl chloride film. Furthermore, the amorphous copolyester backing film 16 is preferably pigmented with titanium dioxide so that it is opaque white in color, while the PVC cover film 12 is preferably transparent, although other color schemes and arrangements are also suitable. Still further, the backing film 16 is considerably thicker than the cover film 12 as it is intended to provide most of the rigidity and strength of the assembled card. For example, the backing film 16 preferably has a thickness of between about 20 and 22 mils, and the cover film 12 preferably has a thickness of between about 7 and 10 mils for a total card thickness of between about 27 and 32 mils. The particular advantage of the subject security media is that good adhesion or fusion can be achieved between PVC and amorphous copolyesters at relatively low temperatures, e.g., at temperatures of about 150° C. The adhesion can be effectively achieved because both amorphous copolyesters and PVC are softened during the lamination process, and both contract on cooling at about the same rate, thereby reducing warping problems encountered with other existing card materials. The subject security media and the scope of possible alternative materials is more fully described and discussed in U.S. patent application Ser. No. 08/128,484.

In order to provide continuous, operation of the apparatus 10, the two-part security media is preferably provided in roll format wherein a first continuous web 20 comprises the clear cover film 12, and a second continuous web 22 comprises the opaque backing film 16. In general, the apparatus 10 consists of first and second thermal web printing devices generally indicated at 24 and 26 respectively for respectively thermally printing images onto the first and second security films 12, 16, a laminating assembly generally indicated at 28 for laminating the security films 12, 16 together, and a die-cutting assembly generally indicated at 30 for die cutting a predetermined size card from the laminated security films 12, 16. More specifically, the thermal web printers 24, 26 are preferably configured for use with a digital computer imaging system (not shown) wherein a digital portrait of the card holder is combined by custom computer software with a background, card holder signature and alphanumeric text to produce a complete full-color digital card image. Digital imaging software, such as that described hereinabove, is well known in the art, and therefore further details will not be specifically described.

Figure 2:
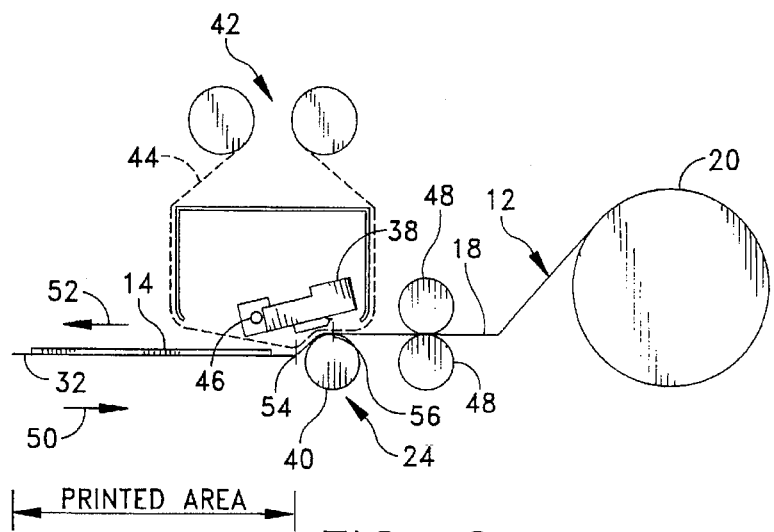
FIG. 2 is an enlarged elevational view of the printing apparatus thereof.
Figure 3:
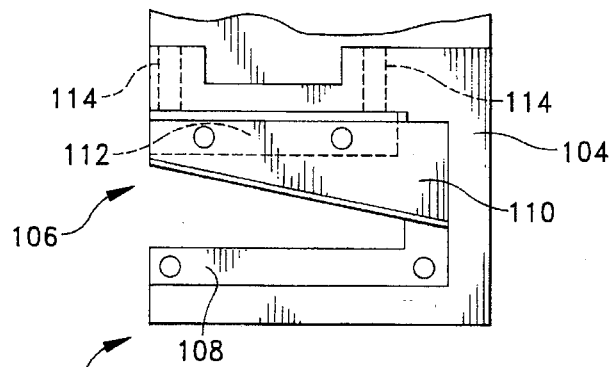
FIG. 3 is a cross-sectional view thereof taken along line 3—3 of FIG. 1.
Figure 4:
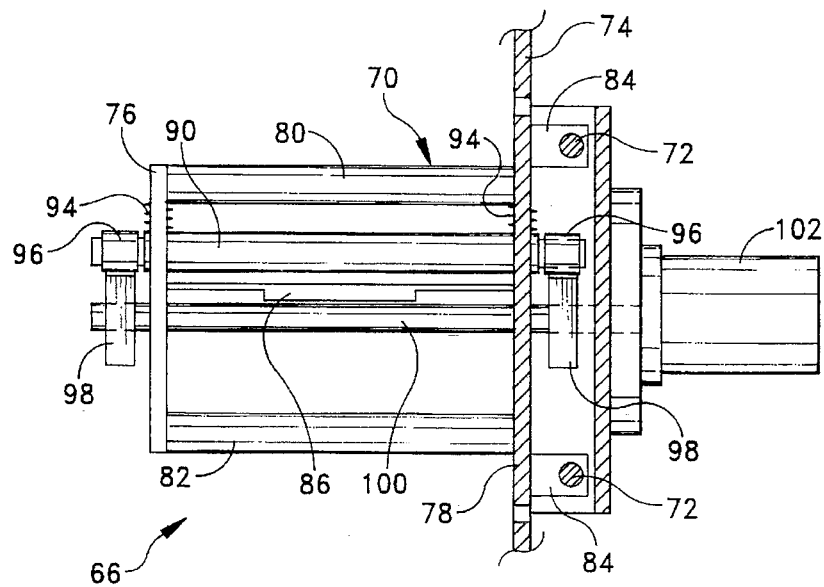
FIG. 4 is a cross-sectional view thereof taken along line 4—4 of FIG. 1.

The first thermal web printer 24 is operative for printing the card image 14 onto the inner surface 18 of the cover film 12 adjacent to the terminal end 32 thereof, and the second thermal web printer 26 is operative for printing a second image 33 onto the back surface 34 of the backing film 16 adjacent to the terminal end thereof 36. Preferably, the first and second web printers 24, 26 operate in a reverse printing direction, i.e. so that they print from a mid-point of the web towards the terminal end. This reverse printing method ensures that little or no media is wasted at the terminal ends due to leader loss as found in convention forward driven printing methods. Web printers incorporating such a reverse printing procedure are available from Atlantek, Inc. of Wakefield, RI 02879 as embodied in the Atlantek Model 60 web printer. However, the details of the printing devices will nevertheless be described in detail to facilitate understanding of the complete operation of the apparatus. Referring now to FIG. 2, the first web printer 24 generally comprises a thermal print head 38 and an associated print head platen 40. The print head 38 has an upstream side positioned adjacent the roll of film 20 and an opposite downstream side. The printer 24 further includes a transfer film roll assembly generally indicated at 42. The transfer film roll assembly 42 includes a thermal dye transfer film 44 having sequential panels (not shown) of Yellow, Magenta and Cyan dye. The roll assembly 42 is mounted in a conventional manner such that the film 44 passes between the print head 38 and the thermal print media 12. The print head 38 is mounted on a pivot 46 so that it is pivotably movable between a first position (not shown) wherein the print head 38 is in biased engagement with the print head platen 40, and a second position (FIG. 2), wherein the print head 38 is spaced from the print head platen 40. A cam mechanism (not shown) is operative for moving the print head 38 between the first and second positions.

The thermal web printer 24 further comprises a pair of drive rollers 48 positioned between the print head 38 and the roll of print media 20. The drive rollers 48 are operative for drawing the print media 12 in an upstream printing direction (arrow 50) when the print head 38 is in the first position, and for advancing the print media 12 in both the upstream direction (arrow 50) and the downstream direction (arrow 52) when the print head 38 is in the second position. The cover film 12 is threaded through the print arrangement as illustrated in FIG. 2 so that a terminal end thereof 32 is positioned downstream of the print head 38.

In operation, the print head 38 is moved to the second (up) position (FIG. 2), and the drive rollers 48 initially advance the print media 12 in an upstream direction (arrow 50) so that the length of print media downstream of the print head 38 is generally equal to the length of the card image 14 being printed. In this connection, the print media 12 is advanced upstream until point 54 is aligned with print line 56. The print head 38 is then moved to the first (down) position, and the print media 12 is drawn through the print head 38 in an upstream or reverse direction, i.e. toward the media roll 20 (arrow 50), whereby the print head 38 thermally prints card image 14 on the print media 12 starting from mid-point 54 on the print media 12 to the terminal end 32. The print head 38 is thereafter pivoted to the up position, and the drive rollers 48 then advance the print media 12 in a downstream direction (arrow 52) so that the next printing operation can be overlaid onto the first printed image. The printer 24 repeats the printing procedure until three separate color images are overlaid to achieve a full-color image 14.

After the three printing operations are completed, the drive rollers 48 advance the print media (cover film 12) in a downstream direction (arrow 52) through upper and lower guides 58 and 60 respectively, until mid-point 54 is positioned underneath a cutter assembly (to be described hereinafter) for severing the printed area between point 54 and end 32 from the roll of print media 20. In this regard, mid-point 54 also comprises the cut line for severance from the roll 20. It is pointed out that the computer software automatically reverses the card image 14 so that it appears in its correct orientation when viewed through the top of the cover film 12.

The second thermal web printer 26 is operative in a like manner for printing the second image 33 onto a back surface 34 of the backing film 16. However, the transfer film 44' of the second printer 26 comprises a solid color black film for monochromatic black printing of text or bar code striping onto the back surface 34 of the backing film 16. In this regard, the second printer 26 only completes one printing operation. After the single printing operation is completed, the drive rollers 48' advance the backing film 16 in a downstream direction, through guides 62 and 64 until midpoint thereof is positioned underneath the cutter for severing the printed area from the roll 22 of backing film. It is noted that the guides 58, 60, 62, 64 align the cover and backing films 12, 16 with the cover film 12 facing downwardly, and the card image 14 positioned between the cover and backing films 12, 16 (See FIG. 6).

The aligned films 12, 16 are thereafter clamped by a clamping assembly generally indicated at 66, and then severed by cutting assembly generally indicated at 68. (See FIGS. 1, 4, and 6). The clamping assembly 66 comprises a carriage generally indicated at 70 which is slide mounted on parallel rails 72 mounted to the frame 74. The carriage 70 includes front and rear walls 76, 78 respectively which are spaced by upper and lower supporting arms 80, 82 respectively. The rear wall 78 includes rearwardly projecting guides 84 through which the parallel rails 72 pass for guiding movement of the carriage 70 in forward and rearward directions. Actuation of the carriage 70 in the forward and rearward directions is accomplished by means of a motor and gear assembly (not illustrated), such as a rack and pinion gear assembly. A guide platform 86 is secured and supported between the front and rear walls 76, 78 for supporting the films 12, 16 in aligned relation. An upper guide member 88 above the guide platform 86 further positions the films 12, 16 in correct alignment. Before the films 12, 16 can be severed from their webs, they are clamped by a clamping arm 90 mounted between the front and rear walls 76, 78 of the carriage 70. The clamping arm 90 is slidably mounted on posts 92 for movement between up (unclamped) and down (clamped) positions with the clamping arm 90 being biased to the down position by means of springs 94 received around the posts 92 and captured between the upper surface of the clamping arm 90 and the lower surface of the upper support arm 80. Each end of the clamping arm 90 includes a roller 96 which is engaged by a cam 98 mounted on a shaft 100. Rotation of the cam shaft 100 by a motor 102 actuates the clamping arm 90 between the clamped and unclamped positions. In operation, the clamping arm 90 is lowered to clamp the aligned films 12, 16 (FIG. 6) between the clamping arm 90 and the guide platform 86. Thereafter the cutting assembly 68 is actuated to sever the films 12, 16 from their webs.

Figure 6:
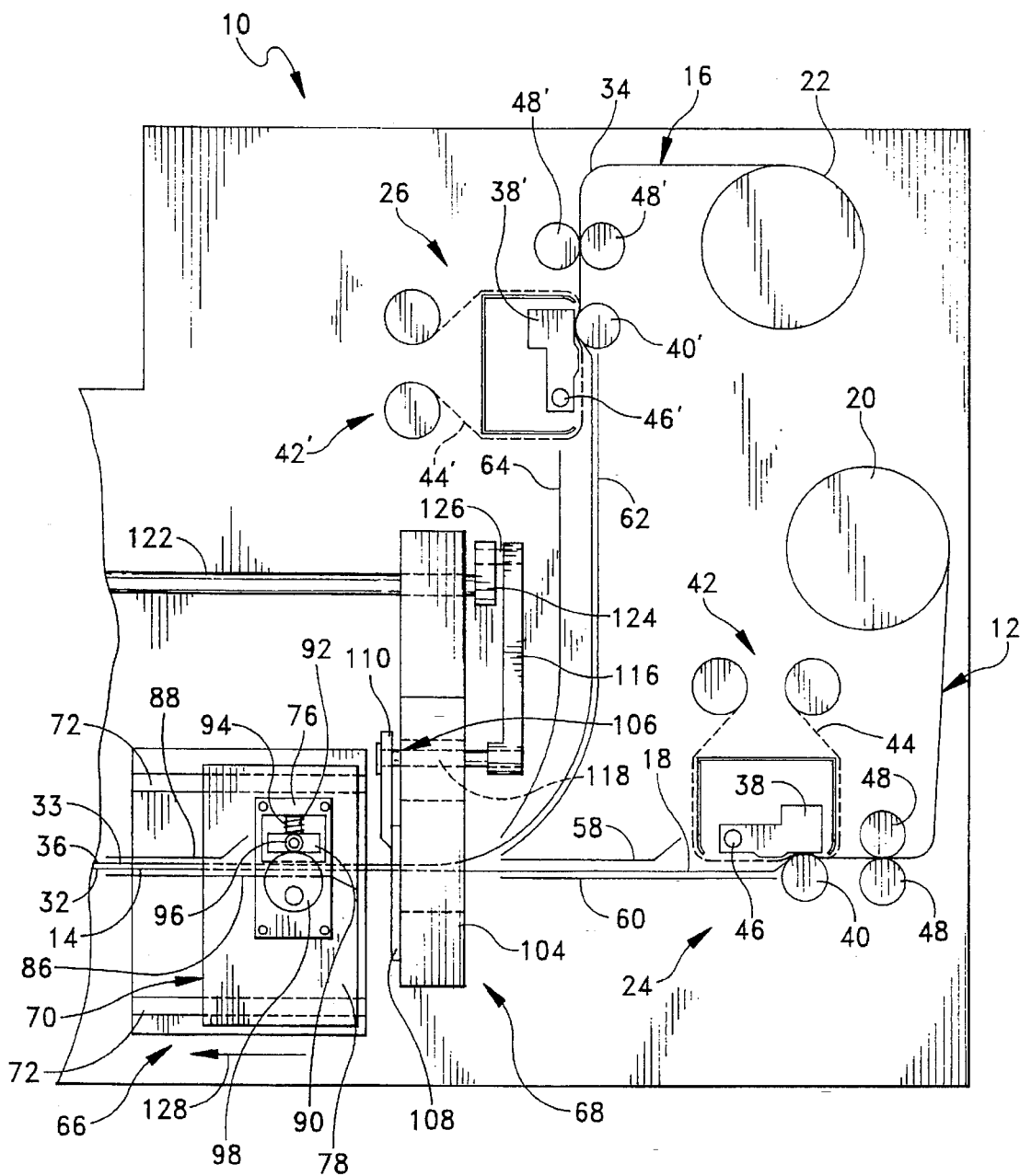
FIG. 6 is an enlarged elevational view of the web printers, the cutting device and the clamping mechanism.

The cutting device 68 comprises a conventional guillotine knife assembly, such as a model GO-80 C guillotine assembly manufactured by Azco Corporation of Elmwood Park, N.J. 07407. The guillotine assembly 68 comprises a C-shaped frame 104, and a knife assembly generally indicated at 106 slidably mounted for movement relative to the frame 104 (See FIG. 3). The frame 104 includes a hardened cutting insert 108 mounted along the lower leg portion of the frame 104 for mating engagement with a blade portion 110 of the knife assembly 106. The blade 110 is mounted to a body portion 112 which is slidably mounted on posts 114 affixed to the frame 104. The body portion 112 is in turn linked to an actuator arm 116 by a shaft 118, and the actuator arm 116 is driven by a motor 120. The shaft 122 of the motor 120 is coupled to a bell crank 124 which is coupled to the actuator arm 116 by a pin 126. In operation, the films 12, 16 pass through the frame 104, and into the clamping assembly 66 as illustrated in FIG. 6, such that the cut lines 54 of the webs rest on the cutting insert 108. Rotation of shaft 122 causes a downward movement of the blade 110 against the cutting insert 108 to sever the films 12, 16 from their web.

With the severed and aligned films 12, 16 still clamped, the carriage 70 is advanced in a forward direction (arrow 128) for insertion of the forward edges of the films into the laminator apparatus 28. The laminator apparatus 28 comprises upper and lower belt assemblies generally indicated 130, 132 respectively which are supported in closely spaced, facing relation. The lower belt assembly 132 comprises a stainless steel belt 134 received around first and second rollers 136, 138 respectively, while the upper belt assembly 130 preferably comprises a teflon impregnated, fiberglass belt 140 received around third and fourth rollers 142, 144 respectively. The belt assemblies 130, 132 are supported in a frame structure (not shown) such that the first and third rollers 136, 142 forman input nip, and the second and fourth rollers 138, 144 form an output nip, with the endless belts 134, 140 in facing relation. The first and second rollers 136, 138 are fixed in position, with the third and fourth rollers 142, 144 being slidably suspended relative to the first and second rollers. The third and fourth rollers 142, 144 are biased downwardly from their suspended position toward the first and second rollers 136, 138 to form spaced, but pressurized input and output nips. The first, or lower, input roller 136 is heated by an internal cartridge heater 146 to a temperature of about 200° C. The heated input nip thus defines an initial laminating stage. A heating platen 148, positioned in abutting relation with an upper portion of the metallic belt 134 adjacent to the first roller 136 is heated to a temperature of about 160° C. to define a full laminating stage. Heat sinks 149, 150 are positioned in abutting relation adjacent to the output nip for cooling the metallic and fiberglass belts 134, 140 passing therebetween. The heat sinks 149, 150 are cooled by respective fans 152, 154 (broken lines) which direct and airflow perpendicular to the direction of belt travel. In operation, the overlying films 12, 16 are fed into the input nip, wherein the backing and cover films 12, 16 are pressed together under the pressure of the nip while simultaneously being heated by the heated lower roller 136 of the input nip. The pressure of the input nip squeezes out air bubbles from between the films during initial heating and fusion of the films, and further maintains the cover and backing films in proper registration during initial heating by the roller 136. Maintaining the films 12, 16 in proper registration during the initial heating of the security media is extremely important, since the plastic films become somewhat soft, and any movement of the films at their interface while in a molten state will cause smudging or smearing of the card image 14 printed on the inner side of the cover film 12. After the initial lamination, the pre-laminated films 12, 16 are transported over the heated platen 148 which further heats the films 12, 16 for a longer duration while in a fixed position wherein they are able to fully fuse or laminate together. The laminated films are thereafter cooled to almost room temperature by passage between the fan-cooled heat sinks 149, 150. The heat sinks 149, 150 effectively remove almost all of the heat from the films prior to exiting from the apparatus between the output nip.

As the laminated film construction 156 (FIG. 5) passes outwardly from the output nip of the laminator 28, it is received between upper and lower guides 158, 160. Adjacent to the end of the guides 158, 160 are upper and lower pinch wheels 162, 164 respectively, which cooperate for advancement of the laminated films into the die-cutting apparatus 30. It is noted that the upper wheel 162 is mounted on an offset axis (See FIG. 5) for directing the laminated film construction 156 against a reference edge 166 of the die cutter assembly 30 while the lower wheel 164 is driven by motor 168, and gears 170, 172. Positioning of the forward edge 174 of the laminated film construction 156 is controlled by a sensor 176 mounted in the die cutter positioning assembly. The sensor 176 is electrically connected to the motor 168 so that when the forward edge 174 of the laminated film construction 156 encounters the sensor 176, the sensor 176 cuts power to the motor 168.

The die cutting assembly 30 comprises a conventional card cutter apparatus 178, such as a model MFD-56 card cutter manufactured by Harco Industries, Inc., Pheonix, Ariz. 85029. The card cutter 178 includes a positioning assembly generally indicated at 180, a movable die body generally indicated at 182, and an upper platform generally indicated at 184. The positioning assembly 180 includes a die plate 186 having an opening 188 which defines a cutting edge, and an upper guide plate 190 having an opening 192 for receiving the die 182. The die plate 186 and guide plate 190 are spaced apart by front and rear reference plates 194 and 166, which define a slot for receiving the laminated film construction 156 (see broken lines). The die body 182 is slidably mounted for upward and downward movement along posts 196 which are anchored to the positioning assembly 180, and is further biased for upward movement by means of springs 198 which are received around the posts 196, and captured between the upper surface of the guide plate 190 and the lower surface of the die body 182. The die body 182 includes a downwardly facing die 200 which is aligned for passage through the opening 192 in the upper guide plate 190 for mating engagement with the opening 188 of the die plate 186. Movement of the die 200 downward through the cutting opening 188 in the die plate 186 causes cutting or punching out of a card 201 having the size of the cutting opening 188.

In operation, actuation of the die body 182 is accomplished by means of a rotated cam 202 which engages with a roller 204 rotatably mounted on the top surface of the die body 182. The roller 204 is mounted on a shaft 206 captured between two lugs 208 on the die body 182. The cam 202 is rotated by motor 120 through a drive gear 210 and transfer gear 212 attached to the camshaft 214.

The die cut card 201 drops down from the die cutter assembly 30 onto a guide plate 216 positioned beneath the die cutter 30. A belt assembly 218 is positioned beneath the guide plate 216 wherein a nub 220 on the belt assembly 218 extends upwardly through a longitudinal channel 222 in the guide plate 216. Forward rotation of the belt assembly 218 causes the nub 220 to engage the rearward edge of the die cut card 201 and advance it forwardly, underneath an upper guide 224 to a magnetic stripe encoding device 226 which is operative for magnetically encoding a magnetic stripe (not shown) positioned on the back surface of the backing film 16. Magnetic stripe encoder devices 226 are well known in the electrical arts and will therefore not be described further.

Figure 5:
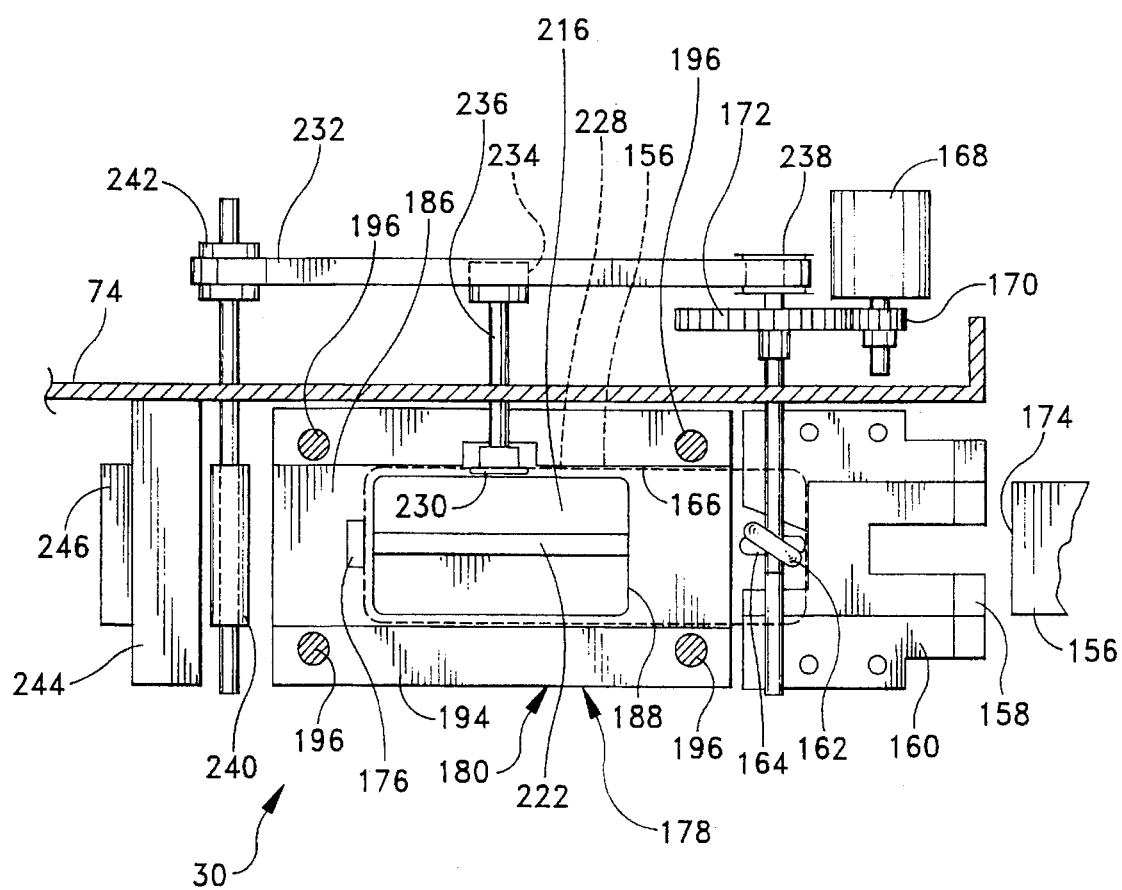
FIG. 5 is yet another cross-sectional view thereof taken along line 5—5 of FIG. 1.

After the card 201 is die cut from the laminated films 156, the waste material 228 (FIG. 5) is advanced out of the positioning slot by means of a friction roller 230 mounted between the plates 186, 190. The roller 230 is rotated by a belt 232 which passes around a pulley 234 attached to shaft 236. (FIG. 5). Belt 232 further passes around pulley 238 which is driven by motor 168. At the outlet end of the positioning plates is a pair of nip rollers 240, also rotated by belt 232 and pulley 242, which grab the waste material 228 and advance it through upper and lower guide channels 244, 246. At the outlet end of the guide channels 244,246 is a further set of rubber belts 248 which grasp the waste material and advance it outwardly of the frame 74 through slot 250 for disposal.

It can therefore be seen that the instant invention provides a novel automated apparatus 10 for instant, one-up printing, laminating and die-cutting of a single identification card 201 from a two-part security media 12, 16. The apparatus 10 provides thermal web printing devices 24, 26 for thermally printing a digital card image 14 onto the security media, laminating apparatus 28 for laminating the security media together such that the card image 14 is positioned between the security media, die-cutting apparatus 30 for die cutting a predetermined size card 201 from the laminated security media 156, and the appropriate guide and advancing mechanisms for guiding and advancing the security media through the printing, laminating and die-cutting apparatus. The apparatus 10 is quick and efficient and therefore it provides a convenient and cost-effective means for instant custom production of identification cards. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Automated apparatus for the automated one-up printing and production of an identification card from a two-part security media including a first continuous web of a cover film, and a second continuous web of a backing film, said apparatus comprising:

first printing means for printing an image onto an inner surface of said cover film between a midpoint of said first continuous web and a terminal end of said first continuous web;

second printing means for printing an image onto a back surface of said backing film between a midpoint of said second continuous web and a terminal end of said second continuous web;

first and second guide channels respectively positioned adjacent to output ends of said first and second printing means for respectively guiding said first and second continuous webs into a clamping device positioned adjacent to an output end of said first and second guide channels wherein the printed terminal ends of said first and second continuous webs are aligned in overlying relation, said clamping device being operable for clamping said aligned terminal ends of said first and second continuous webs in overlying relation;

cutting means positioned between said clamping device and the output ends of said guide channels for severing said clamped and aligned terminal ends of said first and second continuous webs from said respective webs;

fusing means for fusing said severed terminal ends of first and second continuous webs to form a card structure;

first transport means for transporting said clamped and severed terminal ends of said first and second continuous webs from said clamping device into said fusing means; and control means for automatically controlling the sequential operation of said first and second printing means, said clamping device, said cutting means, said first transport means and said fusing means so that said card structure is automatically produced.

2. The apparatus of claim 1 further comprising die-cutting means adjacent an output end of said fusing means for die-cutting a finished card of a desired size from said card structure, and second moving means for moving said card structure from the output end of said fusing means into said die-cutting means, said control means further controlling operation of said second transport means and said die-cutting means to further control the automated production of said finished card.

3. The apparatus of claim 2 further comprising magnetic encoding means positioned adjacent to an output end of said die-cutting means for magnetically encoding a magnetic stripe positioned on an outer surface of said backing film, and third transport means for transporting said finished card from the output end of said die-cutting means to said magnetic encoding means, said control means further controlling operation of said third transport means and said magnetic encoding means to further control the automated production of said finished card.

4. The apparatus of claim 1 wherein said first and second printing means each comprise thermal printing devices which print in a reverse direction whereby an image is printed onto the respective continuous web from the midpoint of said continuous web to the terminal end of said continuous web.

5. Automated apparatus for the automated one-up printing and production of an identification card from a two-part security media including a first continuous web of a cover film, and a second continuous web of a backing film, said apparatus comprising:

printing means for printing an image onto an inner surface of said cover film between a midpoint of said first continuous web and a terminal end of said first continuous web;

first and second guide channels respectively positioned adjacent to an output end of said printing means for respectively guiding said first and second continuous webs into a clamping device positioned adjacent to an output end of said first and second guide channels wherein the printed terminal end of said first continuous webs is aligned in overlying relation with the terminal end of said second continuous web, said clamping device being operable for clamping said aligned terminal ends of said first and second continuous webs in overlying relation;

cutting means positioned between said clamping device and the output ends of said guide channels for severing said clamped and aligned terminal ends of said first and second continuous webs from said respective webs;

fusing means for fusing said severed terminal ends of first and second continuous webs to form a card structure;

first transport means for transporting said clamped and severed terminal ends of said first and second continuous webs from said clamping device into said fusing means; and control means for automatically controlling the sequential operation of said first and second printing means, said clamping device, said cutting means, said first transport means and said fusing means so that said card is automatically produced.

6. The apparatus of claim 5 further comprising die-cutting means adjacent an output end of said fusing means for die-cutting a finished card of desired size from said card structure, and second moving means for moving said card structure from the output end of said fusing means into said die-cutting means, said control means further controlling operation of said second transport means and said die-cutting means to further control the automated production of said finished card.

7. The apparatus of claim 6 further comprising magnetic encoding means positioned adjacent to an output end of said die-cutting means for magnetically encoding a magnetic stripe positioned on an outer surface of said backing film, and third transport means for transporting said finished card from the output end of said die-cutting means to said magnetic encoding means, said control means further controlling operation of said third transport means and said magnetic encoding means to further control the automated production of said finished card.

8. The apparatus of claim 5 wherein said printing means comprises a thermal printing device which prints in a reverse direction whereby an image is printed on to the first continuous web from the mid-point of said first continuous web to the terminal end of said continuous web.

* * * * *